(No Model.)  3 Sheets—Sheet 1.

H. J. BARROWS.
CLOTH MEASURING MACHINE.

No. 289,602.  Patented Dec. 4, 1883.

(No Model.) 3 Sheets—Sheet 2.

H. J. BARROWS.
CLOTH MEASURING MACHINE.

No. 289,602. Patented Dec. 4, 1883.

WITNESSES
Chas. S. Hyer.
A. H. Norris

INVENTOR
Hiram J. Barrows
By W. W. Leggett
Attorney (No Model.) 3 Sheets—Sheet 3.

H. J. BARROWS.
CLOTH MEASURING MACHINE.

No. 289,602. Patented Dec. 4, 1883.

WITNESSES
Chas. S. Hyer.
A. L. Norris

INVENTOR
Hiram J. Barrows:
By W. W. Leggett
Attorney

UNITED STATES PATENT OFFICE.

HIRAM J. BARROWS, OF ARMADA, MICHIGAN.

CLOTH-MEASURING MACHINE.

SPECIFICATION forming part of Letters Patent No. 289,602, dated December 4, 1883.

Application filed April 24, 1883. (No model.)

*To all whom it may concern:*

Be it known that I, HIRAM J. BARROWS, of Armada, county of Macomb, State of Michigan, have invented a new and useful Improvement in Cloth-Measuring Machines; and I declare the following to be a full, clear, and exact description of the same, such as will enable others skilled in the art to which it pertains to make and use it, reference being had to the accompanying drawings, which form a part of this specification.

My invention consists in the combination of devices and appliances hereinafter specified, and more particularly pointed out in the claim.

Figure 1:
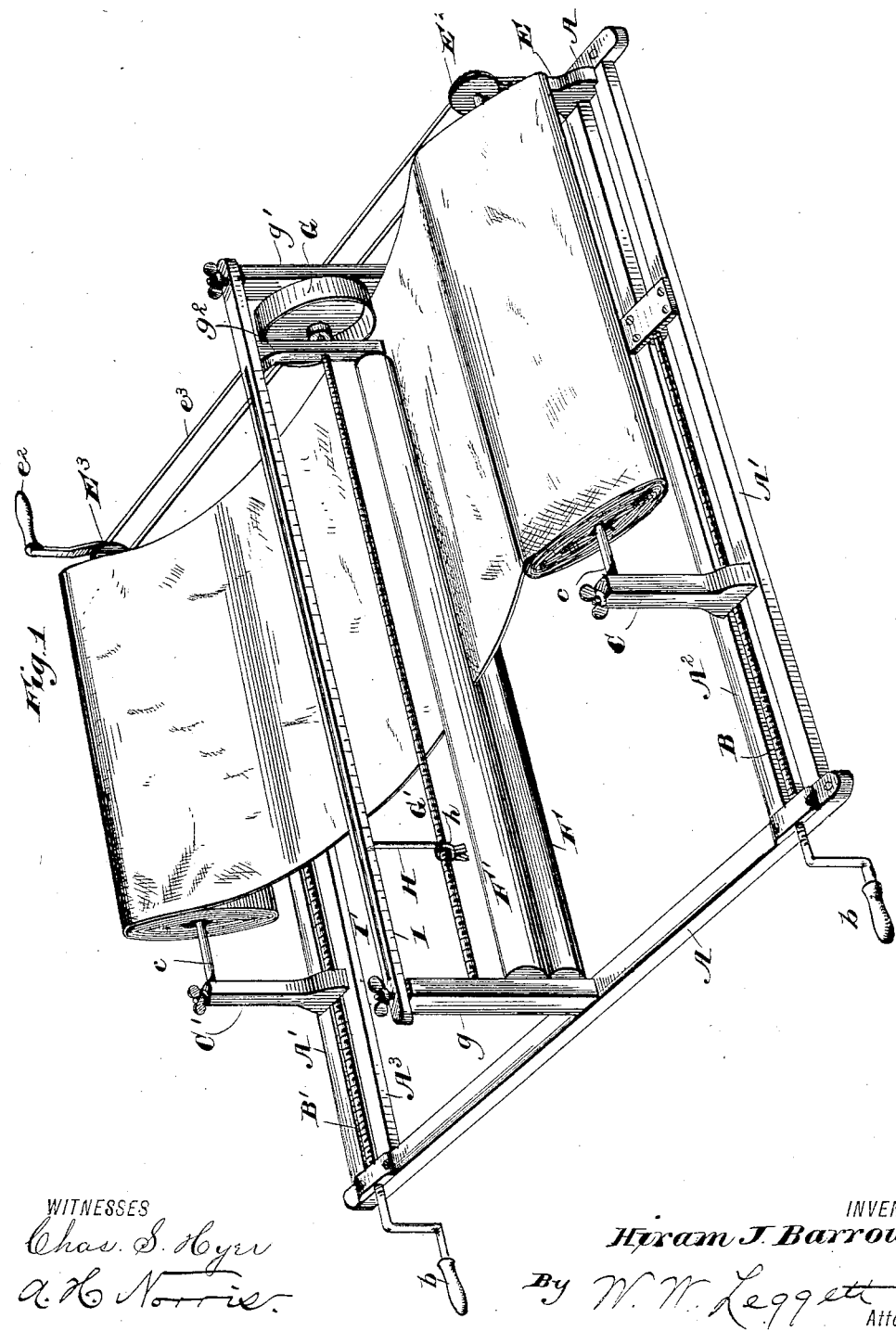
Figure 2:
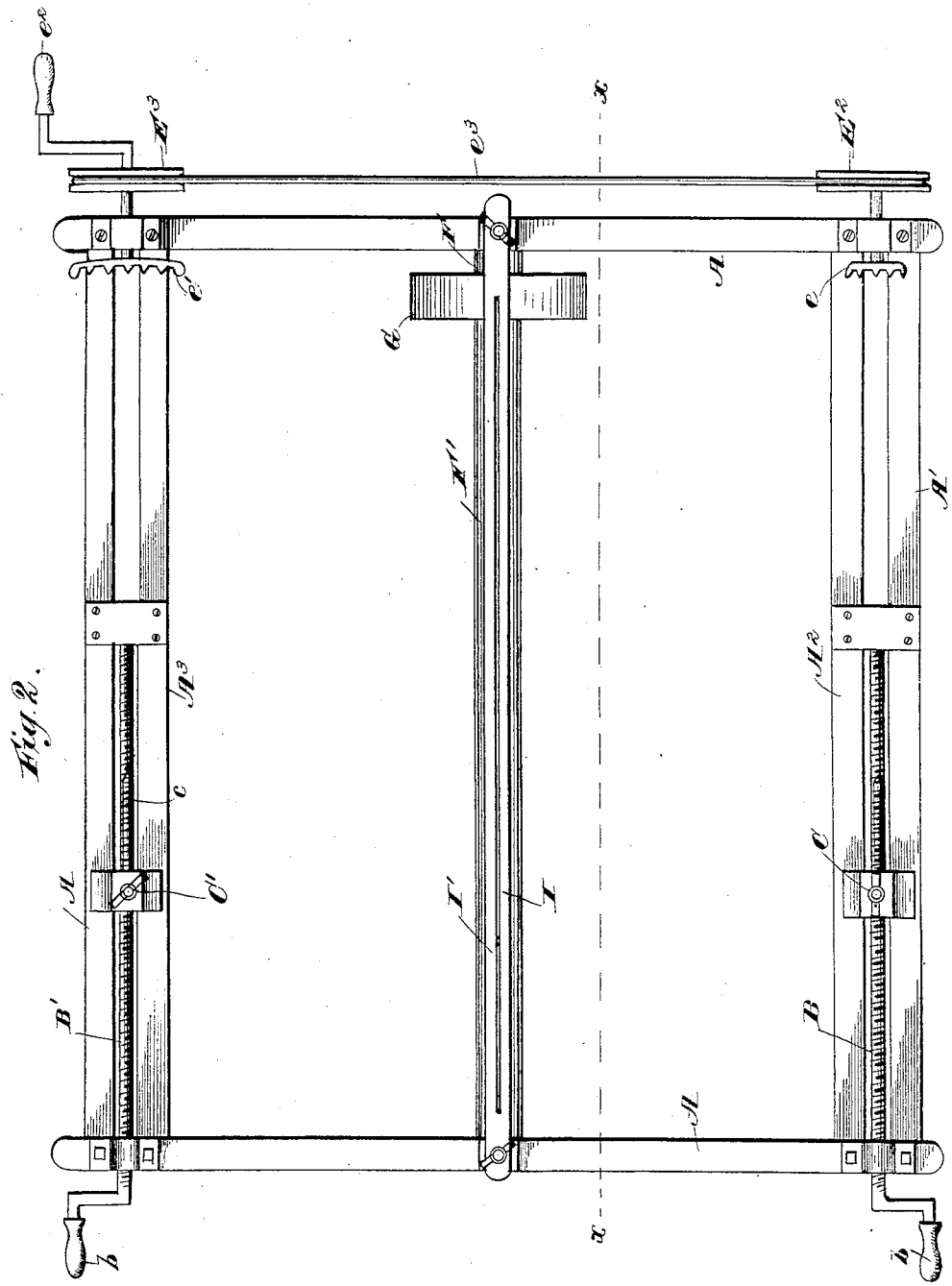
Figure 3:
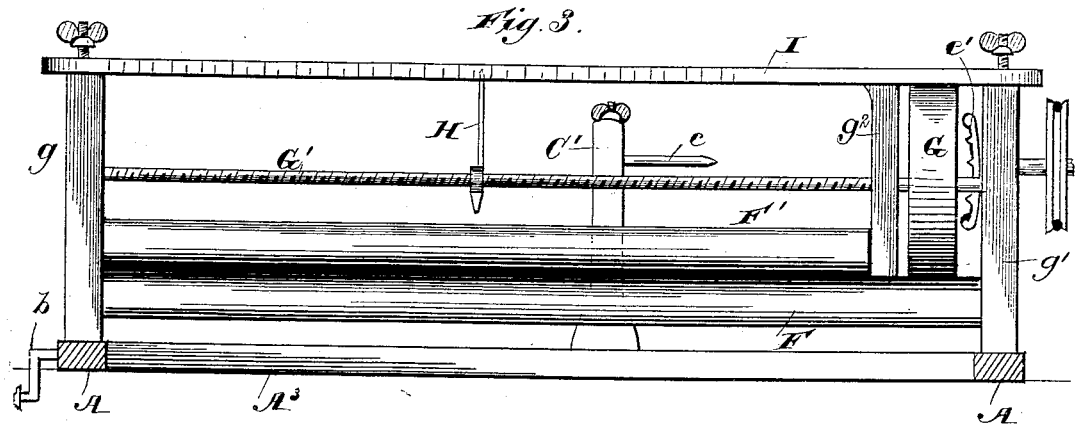
Figure 4:
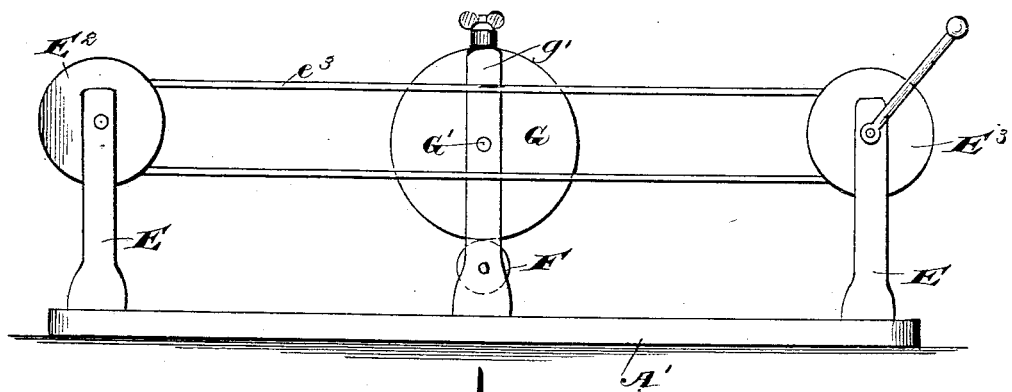
Figure 5:
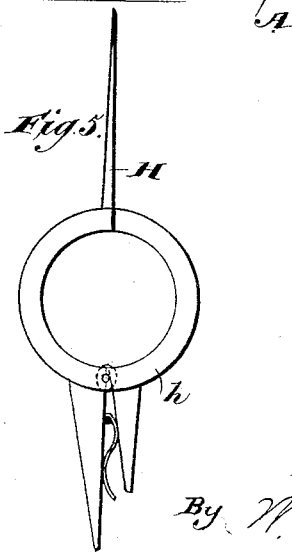

The invention is illustrated in the accompanying drawings, in which Figure 1 represents a perspective view of a machine embodying my invention; Fig. 2, a plan view of the same, the cloth and cloth-reels being omitted; Fig. 3, a sectional view on the line $x\ x$ of Fig. 2; Fig. 4, an end elevation, and Fig. 5 a detached enlarged view of the pointer.

The object of my invention is to provide an improved cloth-measuring machine which shall be economical in its construction, simple in its operation, and which may be constructed for general use, and is especially applicable in dry-goods stores and the like for taking inventories and for analogous purposes, though it may also be adapted for use in mills where the goods are manufactured. It is found very desirable for the purpose of taking an inventory of a stock of dry-goods to have a light, portable, and accurate machine, whereby the goods may be measured rapidly and easily, in which the cloth shall be rolled smoothly, and which shall be adapted for measuring cloth of different widths.

In carrying out my invention, A represents the side pieces of the frame.

A′ represents the end pieces thereof. $A^2$ and $A^3$ represent cross-pieces parallel with the end pieces, A′, said cross-pieces being located at a suitable distance from the two end pieces.

B and B′ represent screw-cut rods or shafts provided with suitable bearings and adapted to be rotated by suitable means—as, for instance, by a hand-crank, $b$.

C and C′ represent sliding clamps adapted to be adjusted backward or forward by rotating the shafts B and B′, respectively, said clamps provided with suitable means adapted to engage suitable reels or cloth-boards, as shown at $c$.

E and E′ represent stationary arms provided with any suitable pulleys, $E^2$ and $E^3$, the shafts of said pulleys having their bearings in said arms, and provided with means for engaging suitable reels or cloth-boards, as shown at $e$ and $e'$, the construction being such that by rotating said pulleys by suitable mechanism—as, for instance, by a crank, $e^2$, and a connecting-belt, $e^3$—reels secured upon the sliding clamps C and C′ and the arms E and E′ may each be rotated simultaneously. It is evident that by this mechanism the sliding clamps may be adjusted nearer to or farther from the arms E and E′, so as to engage rolls of cloth of various widths. It is also obvious that the construction is such that a roll of cloth may be unwound from one of the reels and be rolled up upon the other simultaneously.

The frame A is provided with bearings $g$ and $g'$, rigidly secured thereto.

F is a roller suitably journaled therein and extending from side to side of the frame.

I and I′ represent scale-bars secured upon the said bars, preferably in an adjustable manner, said scale-bars being provided with a pendent bearing, $g^2$, intermediate of the bearings $g\ g'$.

F′ represents a roller shorter than the tension-roller F, and journaled in the bearing $g$ and the pendent bearing $g'$.

G indicates a friction-wheel provided with a screw-cut shaft, G′, said shaft being journaled in the bearings and carrying a pointer, H. The friction-wheel is so located as to have contact with the roller F. Instead of using two scale-bars, one only could be used, if desired. The pointer H is adapted to travel upon the screw-cut portion of the shaft G′. I construct the head $h$ of said pointer in such a manner that it may be readily disengaged from the shaft and be moved back freely upon it. This may be done by constructing said head in the form of a hinged nut provided with a suitable spring adapted to hold the hinged portions suitably in contact with the shaft, and which may be readily disengaged therefrom. I would have it understood, however, that I do not confine myself to any precise method of constructing said pointer, so that it shall be adapted to travel on the shaft and be readily moved back to the starting-point. The end of the pointer is adapted to travel backward and forward between the two scale-bars I and I', or against the edge of one of them.

The operation of the device is as follows: A roll of cloth is secured between the clamp C and stationary arm E, and the end passed through between the tension-rollers F and F' and under the friction-wheel G, the upper roller being made shorter than the lower one, so that both the friction-wheel and the upper roller may have a bearing upon the cloth. The end of the cloth is then secured upon a reel held in position between the clamp C' and the stationary arm E', which reel is then rotated by rotating the shaft of the pulley $E^3$, which may be done by a crank or otherwise. As the said pulley or cloth-board is rotated, the cloth is unwound from the roll and rewound upon said reel after passing between the tension-rollers and under the friction-wheel. The tension of the rollers and the friction-wheel upon the cloth may be regulated by means of set-screws or other suitable means for different thicknesses of cloth. This adjustment being properly made, it is evident that the friction-wheel G will be rotated as the cloth is rewound by means of its frictional contact with the cloth as it passes over the tension-roller beneath. The rotation of the friction-wheel, it will be seen, rotates the extended screw-cut end of the shaft, and thereby causes the pointer to travel along the scale-bars I and I', the pointer being prevented from turning about with the shaft by the contact of its extremity upon the edge of one of the scale-bars. When the pointer has traveled across the scale-bar, its head is disengaged from the shaft and is set again at the opposite end of the scale-bar.

In practical operation this device has been found to measure accurately and easily, while the tension of the rollers upon the cloth causes it to be smoothly rewound upon the reel. The device is simple, not likely to get out of order, occupies but little room, is comparatively inexpensive, and is adapted for use with every variety, width, and heft of goods desired to be measured.

I have shown the pointer as passing between two scale-bars. I do not, however, confine myself to the use of two of said bars, as one bar only might be used, if preferred.

The connecting-belt $e^3$ herein described, and shown in the drawings, might be dispensed with. Its use may serve to give a steadier motion; but it is obvious that by rotating the reel upon which the cloth is to be rewound, the tension upon the cloth will revolve the other reel were the two entirely disconnected.

I would have it understood that I desire to use or dispense with the connecting-belt, as may be desired.

What I claim is—

A cloth-measuring machine consisting of a supporting-frame having upright bearings $g$ and $g'$, rigidly secured thereto, a roller, F, journaled therein, and one or more scale-bars secured upon said bearings, said scale bar or bars being provided with a pendent bearing, $g^2$, intermediate the bearings $g$ and $g'$, a roller, F', journaled in the bearing $g$ and pendent bearing $g^2$, a screw-cut shaft, G', carrying a pointer, H, and a friction-wheel, and journaled in the bearings, said wheel having contact with the tension-roller F, and actuated by the friction of the cloth passing between the said roller and the wheel, and adjustable mechanism upon opposite sides of the rollers for engaging the cloth-reels, substantially as described.

In testimony whereof I sign this specification in the presence of two witnesses.

HIRAM J. BARROWS.

Witnesses:
  WM. H. CLARK, Jr.,
  H. P. BARRINGER.